(12) United States Patent
Burke et al.

(10) Patent No.: US 6,582,251 B1
(45) Date of Patent: Jun. 24, 2003

(54) HERMETIC ELECTRICAL CONNECTOR AND METHOD OF MAKING THE SAME

(75) Inventors: Charles P. Burke, Humble, TX (US); Ronald E. Taylor, Houston, TX (US); Robert G. Ruiz, Houston, TX (US)

(73) Assignee: Greene, Tweed of Delaware, Inc., Wilmington, DE (US)

( * ) Notice: Subject to any disclaimer, the term of this patent is extended or adjusted under 35 U.S.C. 154(b) by 0 days.

(21) Appl. No.: 09/561,836

(22) Filed: Apr. 28, 2000

(51) Int. Cl.[7] ............................................... H01R 13/40
(52) U.S. Cl. ..................... 439/589; 439/606; 439/935
(58) Field of Search ................... 439/589, 587, 439/606, 435, 695

(56) References Cited

U.S. PATENT DOCUMENTS

| | | | |
|---|---|---|---|
| 4,053,201 A | 10/1977 | Grappe | 439/589 |
| 4,356,344 A | 10/1982 | Carey | 174/523 |
| 4,519,662 A * | 5/1985 | Riley et al. | 439/271 |
| 4,797,122 A * | 1/1989 | Kuboi et al. | 439/589 |
| 4,984,973 A * | 1/1991 | Itameri-Kinter et al. | 439/422 |
| 5,203,723 A | 4/1993 | Ritter | 439/589 |
| 5,278,357 A | 1/1994 | Yamanashi | 174/151 |
| 5,299,949 A | 4/1994 | Fortin | 439/275 |
| 5,387,119 A | 2/1995 | Wood | 439/281 |
| 5,485,673 A | 1/1996 | Lau | 29/883 |
| 5,518,415 A | 5/1996 | Sano | 439/204 |
| 5,535,512 A | 7/1996 | Armogan | 29/877 |
| 5,630,732 A | 5/1997 | Yamanashi | 439/589 |
| 5,733,145 A | 3/1998 | Wood | 439/604 |
| 5,797,761 A | 8/1998 | Ring | 439/320 |
| 5,823,811 A | 10/1998 | Blanchfield et al. | 439/274 |

OTHER PUBLICATIONS

Greene, Tweed & Co., Inc., Bearing/Washer, 8–Pin connector, Drawing No. SKR27037.
Greene, Tweed & Co., Inc., Pin, Ø.039 × Ø.039 × 1.805, Drawing No. SKR27038.
Greene, Tweed & Co., Inc., Molded Blank w/ Washer, 8–Pin Connector, Drawing No. SKR27039.
Greene, Tweed & Co., Inc., Machined, 8–Pin Connector, Drawing No. SKR 27040.

(List continued on next page.)

Primary Examiner—Tulsidas Patel
(74) Attorney, Agent, or Firm—Akin Gump Strauss Hauer & Feld, L.L.P.

(57) ABSTRACT

A hermetic pressure connector for providing a pressure-tight, electrically-conductive connection through a hole in a bulkhead. The connector includes a transverse support member having a passage therethrough. A conductor pin extends through the passage. A molded body surrounds at least a central portion of the pin and electrically insulates the transverse support member from the pin and the pin from the bulkhead. The molded body is directly sealingly engaged to the conductor pin. A method of making a hermetic pressure connector for providing a pressure-tight, electrically-conductive connection through a hole in a bulkhead. The method includes placing a conductor pin into a passage in a transverse support member and positioning the conductor pin and transverse support member within an injection mold having the desired finished shape of the molded body. The positioning is such that the conductor pin is spaced from the transverse support member. The method also includes injecting a polymeric material into the injection mold for creating a molded body which surrounds the conductor pin and electrically insulates the conductor pin from the transverse support member. The molded body, conductor pin and transverse support member are removed from the injection mold.

21 Claims, 5 Drawing Sheets

OTHER PUBLICATIONS

Greene, Tweed & Co., Inc., 8–Pin Connector, #20 M/M × 1.805, Drawing No. SKR27041.

Greene, Tweed & Co., Inc., Quotation to Compass Guidance Systems (Feb. 25, 1999).

Compass Directional, Purchase Order (Mar. 15, 1999).

Greene, Tweed & Co., Inc., 10–Pin Hermaphrodite Connector 6 Male / 4 Female Pin × #20 Solder Cups, Drawing No. SKR26039.

Greene, Tweed & Co., Inc., 10–Pin Hermaphrodite Connector 4 Male / 6 Female Pin #20 Solder Cups, Drawing No. SKR26042.

Avalon Sciences Ltd., "Purchase Order", 1 page, Jan. 28, 1999.

Greene, Tweed & Co., Inc., "Quotation for 8–Pin Connector & Boot Assembly", 1 page, Mar. 23, 1999.

* cited by examiner

HERMETIC ELECTRICAL CONNECTOR AND METHOD OF MAKING THE SAME

BACKGROUND OF THE INVENTION

This invention relates to electrical connectors and, more particularly, to hermetically sealed electrical connectors for use in passing electrical conductors through a bulkhead while simultaneously isolating high pressure on one side of the bulkhead from low pressure on the other side of the bulkhead and methods of making the same.

Various structures have been developed as electrical connectors to allow ready attachment and detachment of wires between electrical devices. Many electrical connectors include a plug and a receptacle. The plug includes one or more electrically conductive male contacts or pins, and the receptacle includes a like number of female electrically conductive contacts. Either the male contacts, the female contacts, or both are permanently electrically connected to wires or leads. Either the plug or the receptacle is mounted in a wall or secure structure, such as a bulkhead, although in some instances both the plug and the receptacle will be connected to one another independently of any other structure. Electrical connection is easily achieved by pushing the male contacts on the plug into the receptacle (or vice versa), and disconnection is achieved by pulling the plug out of the receptacle. Such components are often mated with other components such as socket blocks or sealed connector boot assemblies. Where the connector is situated within a bulkhead, the connector is essentially the main component and attachment to each of the exposed ends of the conductors of the connector could be accomplished either by direct and permanent connection to egress leads or by removable connections as described above.

Generally the electrically conductive contacts of both the plug and the receptacle are supported in a dimensionally stable, electrically insulative material surrounded by a metallic housing or similar rigid structure. This insulator electrically isolates the various contacts and further maintains alignment of the contacts for ready connection and disconnection and to maintain electrical isolation from the housing and the bulkhead, if any. Metal housings are often used to provide greater support for the connector, and are particularly useful in settings where high forces will be encountered by the connector. Notwithstanding the advantages of using housings, such structures can have significant drawbacks, including the cost of making the housings and incorporating the housings into the connector.

Moreover, in certain settings it is desired that either the plug or receptacle be "hermetically" sealed, i.e., sealed so as to prevent egress of fluids across a boundary created by the seal. Hermetically sealed connectors are particularly useful when it is necessary to maintain a controlled environment on one or both sides of the connector, and specifically where the integrity of electrical power or an electrical signal must be maintained between a region of relatively high pressure from a region of relatively low pressure. Hermetic connectors have particularly great utility in the field of downhole well tools used for subterranean drilling operations, where temperatures exceed 400 degrees Fahrenheit and pressures can reach above 25,000 pounds per square inch. In such settings, various electronic components are housed within the downhole well tools and such electronics generally are designed to operate at atmospheric pressure, thereby requiring effective isolation between the high pressures of the ambient environment within the well and the pressure within electronics modules. Additionally, it is generally required that electrical leads pass from within the sealed well, at high pressure, to the ambient conditions above ground to provide for control and monitoring within the well. Accordingly, for both conditions, hermetic connectors are essential to the functioning of downhole well tools.

The use of a housing to support an electrical connector in such a high-pressure, harsh environment presents the additional problem of sealing the interface between not only the connector and the bulkhead, but also between the insulator and the housing. Where down time due to a failure of a seal can be extremely costly, elimination of a possible leak path is a significant advance in the art. Thus, elimination of the housing, while maintaining the structural support provided by the housing, would be a significant advance in the art.

The connector of the present invention eliminates the housing and the problems associated therewith and provides an electrical connector that also serves to seal a relatively low pressure from real or potential exposure to a relatively high pressure. It can withstand extremely high differential pressures, up to at least 25,000 pounds per square inch, while preventing pressure or electrical leakage. It can be used in any environment wherein high pressure differential exists and there is a need to protect electronics or other electrical or mechanical assemblies from exposure to undesirable higher or lower pressures than the those at which they were designed to operate, and where electrical power or signals must be passed across the boundary between high and low pressure.

BRIEF SUMMARY OF THE INVENTION

Briefly stated, the present invention is directed to

A hermetic pressure connector for providing a pressure-tight, electrically-conductive connection through a hole in a bulkhead. The connector includes a transverse support member having a passage therethrough. A conductor pin extends through the passage. A molded body surrounds at least a central portion of the pin and electrically insulates the transverse support member from the pin and the pin from the bulkhead. The molded body is directly sealingly engaged to the conductor pin.

In another aspect, the present invention is a method of making a hermetic pressure connector for providing a pressure-tight, electrically-conductive connection through a hole in a bulkhead. The method includes placing a conductor pin into a passage in a transverse support member and positioning the conductor pin and transverse support member within an injection mold having the desired finished shape of the molded body. The positioning is such that the conductor pin is spaced from the transverse support member. The method also includes injecting a polymeric material into the injection mold for creating a molded body which surrounds the conductor pin and electrically insulates the conductor pin from the transverse support member. The molded body, conductor pin and transverse support member are removed from the injection mold.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
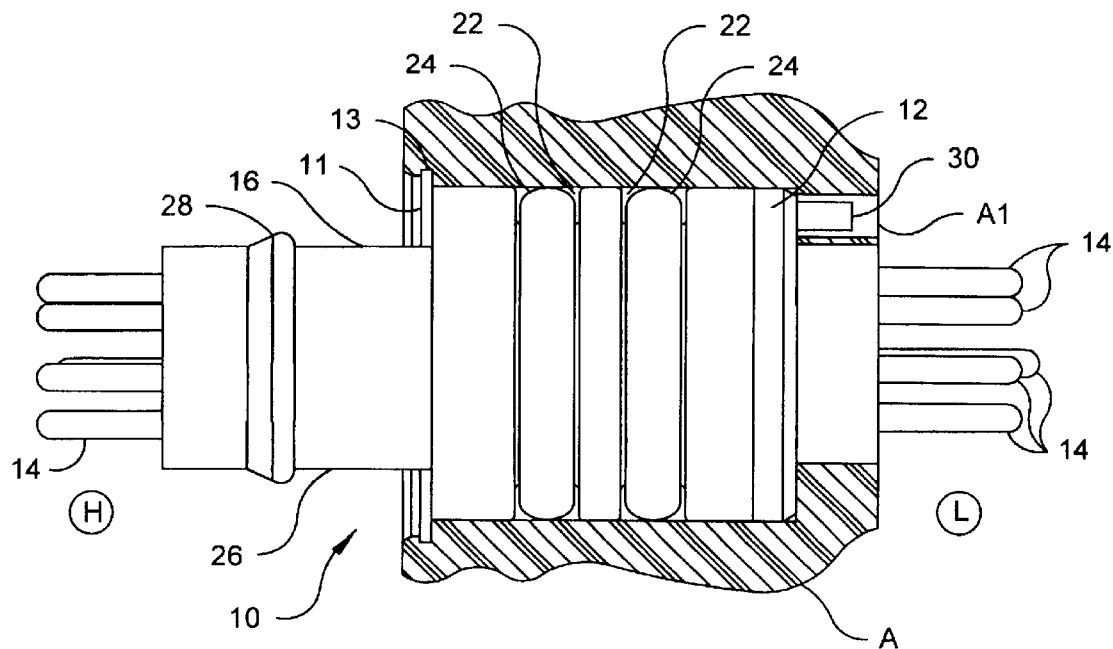
FIG. 1 is a right side elevational-view of a hermetic connector installed within a bulkhead, shown in cross section, in accordance with a first preferred embodiment of the present invention.
Figure 2:
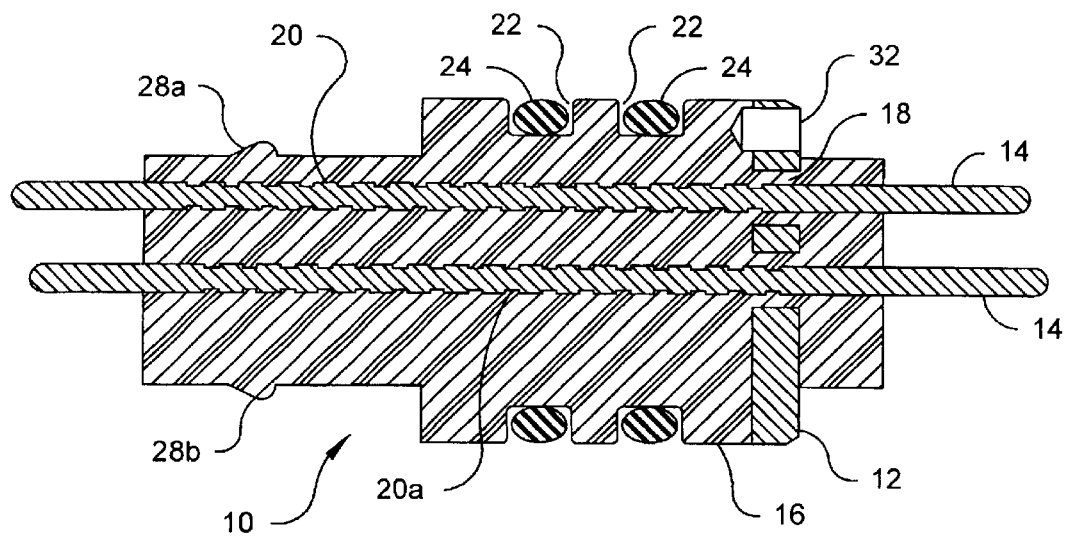
FIG. 2 is a cross-sectional view of the hermetic connector of FIG. 1.
Figure 6:
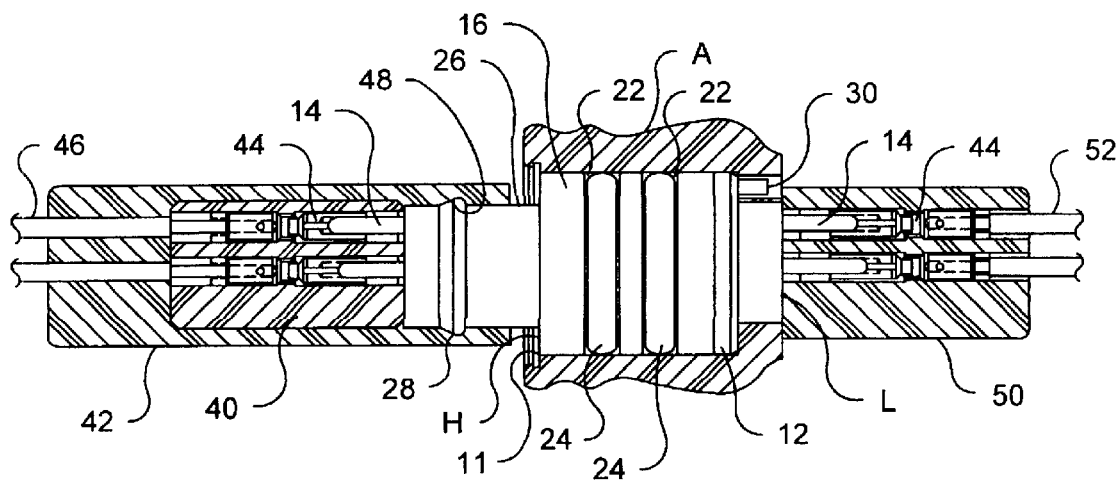
FIG. 6 is a partial cutaway of a connector assembly showing the hermetic connector installed within a bulkhead in accordance with the first preferred embodiment shown in FIG. 1.

In the drawings, like numerals are used to indicate like elements throughout. Referring now to FIGS. 1, 2 and 6, there is shown a hermetic connector, generally designated 10, in accordance with a first preferred embodiment of the invention. The hermetic connector 10 is, for purposes of illustration, described with reference to use in a wellbore tool apparatus of the type well-known to those of ordinary skill in the subterranean drilling art. It will be recognized by those of ordinary skill in the art that the present invention need not be limited in application to the wellbore tool apparatus, but may have application in any situation wherein a difference in environmental conditions exists across a boundary, such as a bulkhead, and it is desired to pass electrical current across the boundary.

Referring now to FIG. 1, the hermetic connector 10 of the present invention is described with reference to providing a pressure-tight, electrically-conductive connection through a hole in a bulkhead A, as shown in FIG. 1. The connector 10 is configured to reside within a hole in a bulkhead A, there being a region of relatively higher pressure H on a first side of the bulkhead A and a region of relatively lower pressure L on the opposing side of the bulkhead A.

Referring now to FIGS. 1 and 2, the conductor 10 includes a transverse support member 12, a plurality of conductor pins 14, and a molded body 16. As best shown in FIG. 2, the transverse support member 12 is essentially a disk-shaped member having at least one passage 18 therethrough to permit passage of the conductor pins 14 through the transverse support member 12. It should be understood that the transverse support member 12 is not part of a cylindrical member, i.e., a housing (not shown). The use of the transverse support member 12 eliminates the need for a housing by providing structural support to the pins and to the connector 10 generally sufficient to withstand the forces of the pressure differential across the bulkhead A. The transverse support member 12 generally will rest against a shoulder or like feature within a recess or hole in the bulkhead A, thus supporting the connector 10. It is contemplated that the transverse support member 12 could be sealed or joined to the bulkhead A by using a low temperature welding technique like laser or electron beam welding. In this way, the transverse support member 12 can be sealed, thereby providing a pressure tight relationship between the connector and the bulkhead A, or merely joined to provide greater support for the connector 10 and enhanced security against unintentional displacement of the connector 10.

The number of passages 18 corresponds to the number of conductor pins 14 in the connector 10. The transverse support member 12 provides support to the conductor pins 14 thereby maintaining the positions of the conductor pins 14 and separation of the conductor pins 14 one from the other and from the bulkhead A, as discussed in more detail hereinafter. It is essential that the passages 18 through the transverse support member 12 be larger than the diameter of the conductor pins 14, such that the conductor pins 14 do not electrically short against the transverse support member 12, as will also be discussed in greater detail below.

The support member 12 is preferably made from a metallic material, and more preferably from martensitic, precipitation hardened stainless steel alloy UNS S17400, commonly referred to as 17-4 SS, available from Earl M. Jorgensen Inc., located in Houston, Tex. The 17-4 SS material is preferably designated at the H1025 condition to minimize the thickness of the transverse support member 12 and to provide the desired resistance to bending and elongation. Where very low magnetic permeability is desired, the preferred material is UNS C17300 beryllium copper alloy, available from Brush Wellman Inc., located in Cleveland, Ohio. It is also contemplated, however, that the transport member 12 could be made from any rigid material that provides adequate support for the conductor pins 14 when subjected to extremely high pressure differentials.

Those of ordinary skill in the art will recognize, the thickness of the transverse support member 12 can be varied to suit the specific strength required in a given application, depending on the pressure differential across the connector 10 and the material from which the transverse support member 12 is constructed. It is preferred that the transverse support member 12 extend radially to contact the bulkhead A, as best shown in FIG. 1, such that the transverse support member 12 provides support to the connector 10 across its entire diameter, thereby improving the resistance of the connector 10 to high pressure differentials across the bulkhead A. The conductor pins 14 pass through the passages 18 in transverse support member 12 thereby providing a conductive path through the connector 10 for passage of electrical current. The number of conductor pins 14 may vary from one to several, depending on the needs of the particular application. It is contemplated that the number of conductor pins 14 could be increased to as many as sixty. However, as those of ordinary skill in the art will recognize, there is no real upper limit on the number of conductor pins 14 that could be accommodated. Of significance in determining the number of conductor pins 14 that can be accommodated in the connector 10 is the gauge or diameter of each conductor pin 14.

As best shown in FIG. 2, each conductor pin 14 includes at least one circumferential interlocking member 20. The circumferential interlocking member 20 is encased by the molded body 16 for interlocking the conductor pin 14 and the molded body 16, as will be discussed more fully below. The circumferential interlocking member 20 preferably consists of a series of square-bottomed circumferential grooves 20a in the external surface of the conductor pin 14, but could include any feature, such as threads, circumferential ridges, pins, or merely an irregular surface, etc., that would permit an interlocking relationship between the molded body 16 and the conductor pin 14. The conductor pin 14 is preferably constructed from beryllium copper alloy, UNS C17300, available from Brush Wellman Inc., located in Cleveland, Ohio, but numerous other conductive metallic materials are also used including 17-455, Inconel X750 55, brass and other copper alloys, stainless steel, etc.

The molded body 16 surrounds at least a central portion of the conductor pins 14 and electrically insulates the transverse support member 12 from the conductor pins 14 and the conductor pins 14 from the bulkhead A. That the molded body 16 electrically insulates the conductor pins 14 from the transverse support member 12 is a significant advance over the prior art. Whereas in prior art connectors insulating sleeves were required to electrically isolate the conductor pins 14 from a transverse supporting structure, the present connector 10 eliminates the need for insulating sleeves by providing a method (described below) wherein the molded body 16 itself creates the insulating sleeve between the conductor pins 14 and the transverse support member 12. Additionally, the connector 10 is a significant advance over the prior art in that the molded body 16 is directly sealingly engaged to each conductor pin 14. In other words, whereas in the prior art a bonding agent or epoxy was used to sealingly bond the conductor pin 14 into the molded body 16, the connector 10 eliminates the need for a bonding agent, epoxy, or other chemical bonding material by providing circumferential interlocking members 20 that interlock with the molded body 16 and by employing a unique method (described below) of molding the molded body 16 around the conductor pins 14.

It is contemplated that the overall size of the conductor 10 could be as large as three inches or more to accommodate a large number of conductor pins 14. It should be recognized, however, that there are practical considerations beyond merely the number of conductor pins 14 that must be considered in determining the size of the connector 10. A first consideration is that as the volume of the molded body 16 increases, the polymeric material required to make the molded body 16 increases and eliminating voids within the molded body 16 (as described below) becomes more difficult. Such voids could lead to electrical leakage between the conductor pins 14, or between the conductor pins 14 and the bulkhead A. Additionally, the greater the diameter of the molded body 16, the greater the stress on the transverse support member 12 due to the pressure differential across the bulkhead A, thus requiring a stronger transverse support member 12, i.e., one that is either thicker or made from strengthened material. Additionally, as those of ordinary skill in the art will recognize, as the thickness of the transverse support member increases, so does the difficulty in making the polymeric material of the molded body 16 flow through the passages 18 to electrically insulate the conductor pins 14 from the transverse support member 12. Again, although there is no limit to the diametrical size of the connector 10, a preferred size, due to its ease of construction, is a connector 10 having an outer diameter of approximately one inch and a length of two inches. Preferred construction with regard to a one inch diameter molded body 16, accordingly, is a transverse support member 12 constructed from UNS S17400 alloy of approximately 0.20 inches thickness having approximately seventeen conductor pins 14. However, the preferred number of conductor pins 14 within this envelope can vary, as stated above, depending on the diameter and strength of the conductor pins 14.

To permit enhanced sealing between the connector 10, and in particular the molded body 16, and the bulkhead A, the molded body 16 preferably includes at least one circumferential groove 22 in an external surface thereof. A seal ring 24, preferably an O-ring, is situated in the circumferential groove 22 so as to form a seal between the molded body 16 and the bulkhead A. The seal ring 24 is preferably constructed from Compound #926, available from Greene Tweed & Co., Inc., located in Kulpsville, Pa. It is contemplated that more than one circumferential groove 22 and seal ring 24 may be employed without departing from the scope and spirit of the invention. Additionally, it is contemplated that the connector 10 could be employed without any circumferential grooves 22 and seals 24, the molded body 16 providing a seal against the bulkhead A, or that alternative devices for sealing (not shown) could be used, including GT rings, Advancap seals, Enercap seals, metal spring energized non-elastomer seals (MSES™), Polypak seals, elastomeric and non-elastomeric cup seals etc.

The molded body 16 preferably is constructed from a polymeric material, preferably insulative thermoplastic, and most preferably from polyetherketone (PEK), produced by Victrex Ltd. and sold by Greene, Tweed & Co. under the trademark Arlon 2000®. This material is most preferable because of its ability to maintain dimensional stability and consistent mechanical properties at high temperatures (in excess of 400° F.). It is contemplated that other polymeric materials, such as ULTEM, PAEK, PEEK, or PEKK, may be employed without departing from the scope and spirit of the invention.

The use of a molded body 16 and transverse support member 12 as described herein provides a significant advance over prior art connectors in that the use of an external housing (not shown) has been entirely eliminated. Whereas prior art connectors employ an external housing as the interface between the connector and the bulkhead A to provide support for the conductor pins 14, the molded body 16 of the connector 10 acts both as an electrical insulator and as structural and sealing interface with the bulkhead A. The elimination of the external housing greatly simplifies the method of manufacturing the connector 10, as described below, thereby reducing the cost to manufacture the connector 10 and reduces the number of potential leakage paths through the connector 10.

As is common in electrical connectors, the connector 10 may include alignment and interlocking features to provide accurate and secure engagement with the bulkhead A and with other connectors (see FIG. 6). The molded body 10 preferably includes a neck 26 for mating engagement with a female receptacle (see FIG. 6). Referring again to FIGS. 1 and 2, the neck 26 includes a coupling ridge 28 to retain the female receptacle thereon. The coupling ridge 28 is preferably ramped on a first side 28a facing outwardly to provide for ease of installation, whereas a second side 28b, facing inwardly, has a steep slope or no slope at all to provide greater retention. Any number of retention features could be employed as alternatives to the coupling ridge 28. The molded body 16 preferably also includes an alignment pin 30 as shown in FIG. 1, to align the connector 10 with a receptacle A1 in the bulkhead A. Alternatively, as shown in FIG. 2, the molded body 16 could include an alignment hole 32 whereas the bulkhead A could include a locating pin (not shown).

The connector 10 of the first preferred embodiment is retained within the bulkhead A through the use of a retaining ring 11 situated in a shallow groove 13 in the bulkhead A. As those of ordinary skill in the art will recognize, alternative mechanisms could be used to retain the connector 10 within the bulkhead A such as threads (not shown) or retaining nuts (not shown).

Referring now to FIG. 6, there is shown a completed assembly including the conductor 10 of the first preferred embodiment residing within the bulkhead A. Attached to the neck 26 of the connector 10 is a first connecting socket assembly 40 residing within an elastomeric boot 42. One or more spring loaded socket assemblies 44 are positioned within the first connecting socket assembly 40 and connect to first electrical leads 46 at one end of the spring loaded socket assemblies 44 and to the conductor pins 14 at the opposite end. The elastomeric boot 42 sealingly engages the first electrical leads 46 and also sealingly engages the neck 26, engaging the circumferential ridge 28 within a circumferential groove 48. A second connecting socket assembly 50 engages the opposite end of the connector 10. Spring loaded socket assemblies 44 are positioned within the second connecting socket assembly 50. Second electrical leads 52 pass into the second connecting socket assembly 50 and are connected to a first end of the spring loaded socket assemblies 44. The opposite end of the spring loaded socket assemblies 44 are positioned on the ends of the conductor pins 14. As shown, the conductor 10 isolates the high pressure region on a high pressure side H of the connector 10 from a low pressure region on a low pressure side L of the connector 10.

Figure 3:
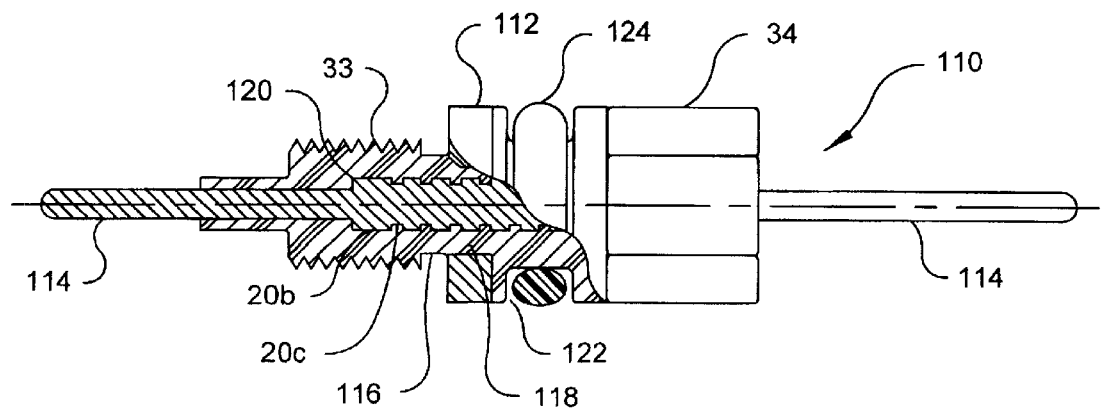
FIG. 3 is a right side elevational-view, partially in cross section, of a hermetic connector in accordance with a second preferred embodiment of the present invention.

A second preferred embodiment is shown in FIG. 3, wherein only a single conductor pin 114 is employed. The conductor 110 includes a transverse support member 112 having a passage 118 therethrough. The conductor pin 114 passes through the passage 118 with sufficient clearance between the conductor pin 114 and transverse support member 112 such that the molded body 116 forms an electrically-insulating barrier (as discussed below) between the conductor pin 114 and the transverse support member 112. The conductor pin 114 includes a circumferential interlocking member 120 consisting of a series of raised circumferential ridges 20b and circumferential depressions 20c to provide interlocking support between the molded body 116 and the conductor pin 114. The molded body 116 also includes a series of threads 33 and at least two opposing flattened faces, preferably a hex nut feature 34, for fastening the connector 110 to a bulkhead A having internal threads (not shown). As is well demonstrated by the second preferred embodiment, forming a connector 110 without a housing wherein the molded body 116 acts as both an electrical insulator and an interface with the bulkhead permits not only less expensive manufacture, but permits great flexibility in molding the molded body 116 to incorporate various features specific to a given application. This permits more rapid turnaround of orders at a lower cost and, perhaps most importantly, eliminates one of the redundant interfaces between the electrical insulator and housing and between the housing and the bulkhead A. This reduces the number of possible leak paths around the outer perimeter of the connector 110 and because the connector 110 includes a transverse support member 112, there is no loss in structural integrity of the connector 110.

Figure 4:
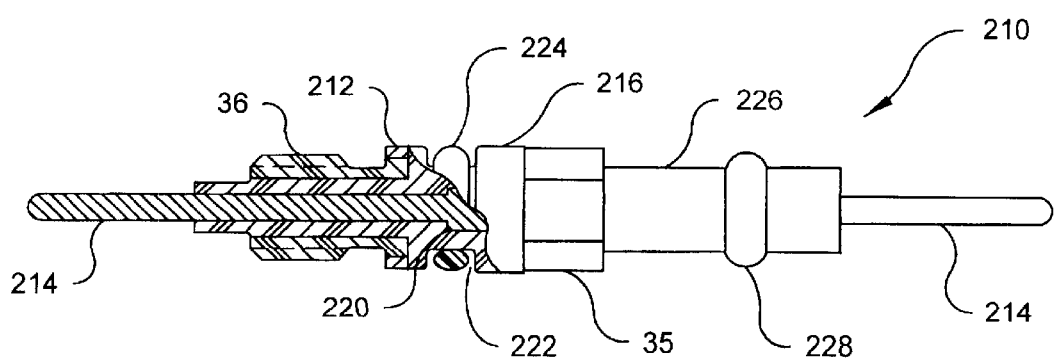
FIG. 4 is a right side elevational-view, partially in cross section, of a hermetic connector in accordance with a third preferred embodiment of the present invention.

In the third preferred embodiment shown in FIG. 4, the connector 210 is very similar to that of the second preferred embodiment, but the transverse support member 212, instead of being a washer-shaped element, extends toward an end of the connector 210 and includes external threads 36 for mounting to internal threads (not shown) of a bulkhead A. The molded body 216 includes at least two opposing flattened external surfaces 35 for gripping the molded body with a wrench (not shown). The molded body 216 also includes a neck 226 having a coupling ridge 228 thereon for retention with a mating component (not shown).

Figure 5:
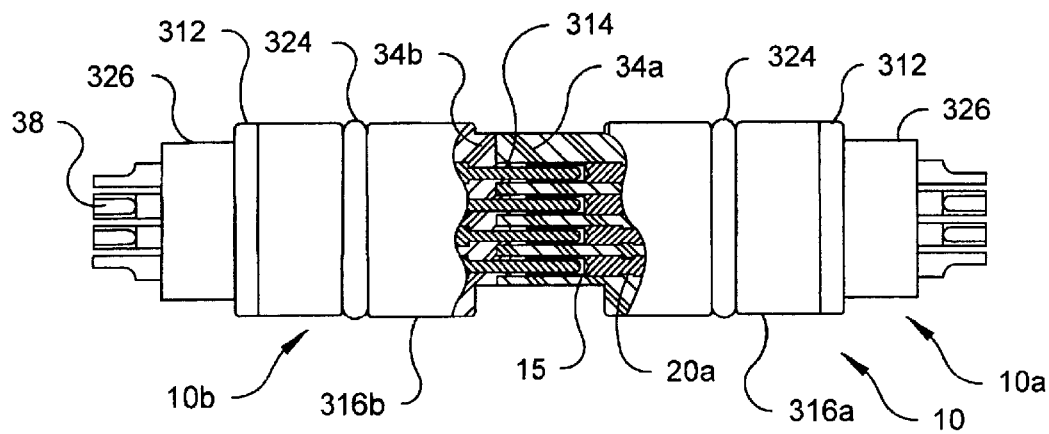
FIG. 5 is a right side elevational-view, partially in cross section, of a hermetic connector in accordance with a fourth preferred embodiment of the present invention.

Referring now to FIG. 5, there is shown a fourth preferred embodiment having a mating arrangement. The connector 10 of the fourth preferred embodiment is essentially a mated female connector 10a and male connector 10b, both similar to those of the first preferred embodiment, and each having a plurality of conductor pins 314. As can be seen, the conductor pins 314 of the female connector 10a have female receptacles 15 on their ends whereas the conductor pins 314 of the male connector 10b have male ends. The outboard ends of the conductor pins 314 of both the female and male connectors 10a, 10b consist of solderless terminals 38 for attachment to leads (not shown). Proper alignment of the female connector 10a with the male connector 10b is in short the use of a first offset 34a on the molded body 316a of the female connector 10a which mates with a second offset 34b on the molded body 316b of the male connector 10b.

Figure 7:
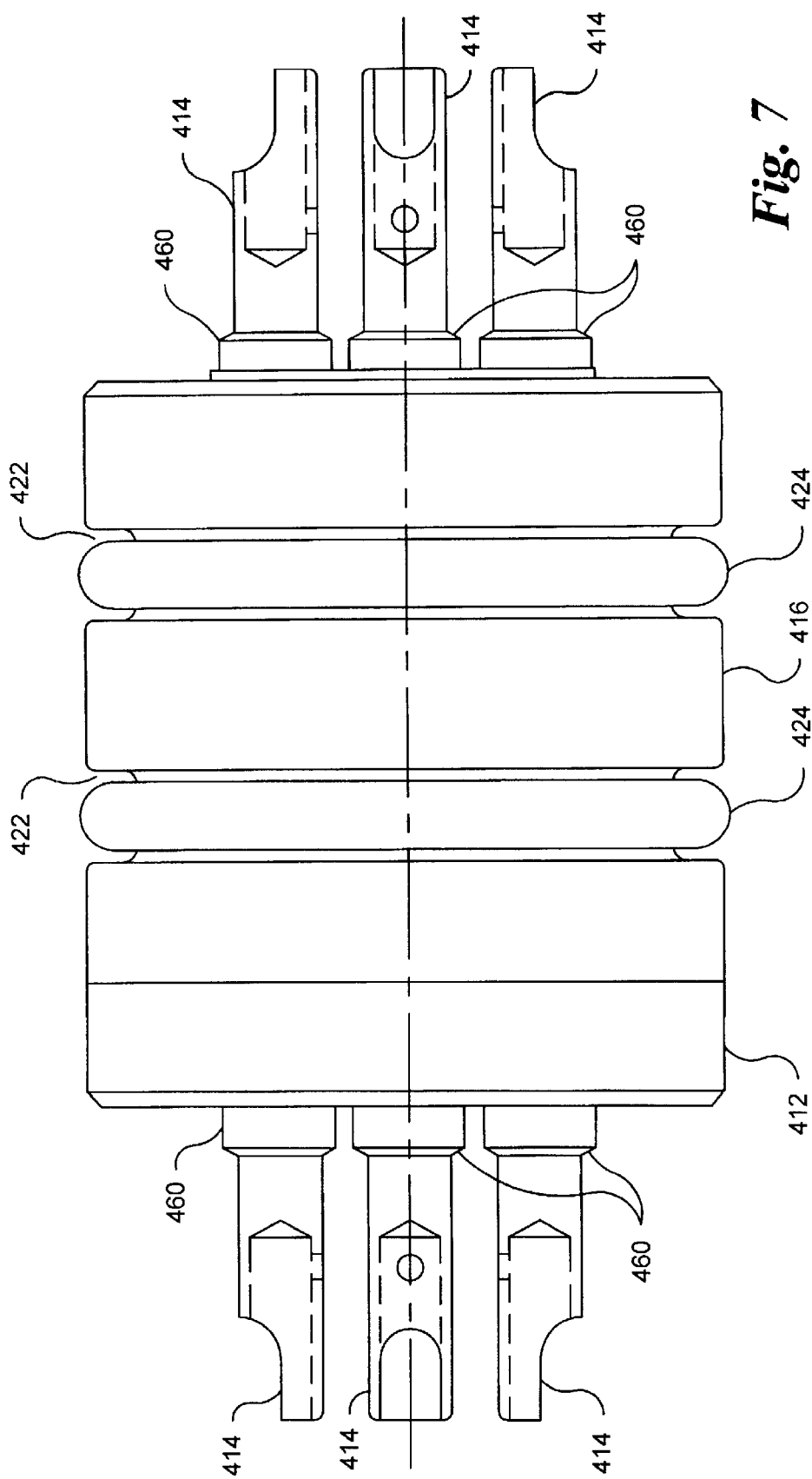
FIG. 7 is a right side elevational-view of a hermetic connector in accordance with a sixth preferred embodiment of the present invention.

A fifth preferred embodiment is shown in FIG. 7, which is similar to the first preferred embodiment, but the molded body 416 extends through the transverse support member 412 to form shoulders 460. The shoulders 460 preferably surround a portion of the exposed length of one or more of the conductor pins 414. One significant function of this is that the shoulders serve to lengthen the potential short path between the transverse support member 412 and the conductor pins 414, and between the conductor pins 414 in any exposed area between the connector 10 and any mating connector (not shown).

Figure 8:
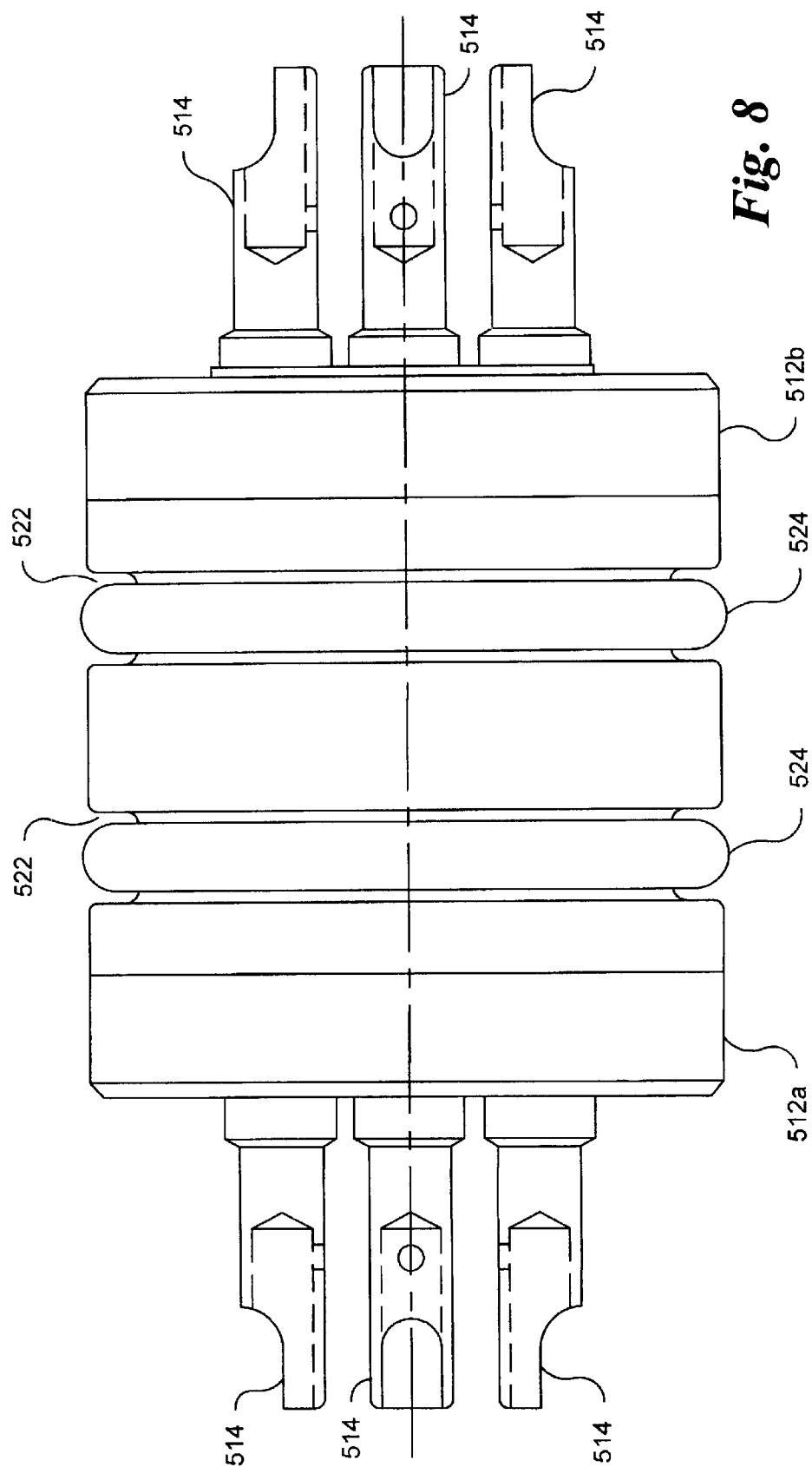
FIG. 8 is a right side elevational-view of a hermetic connector in accordance with a sixth preferred embodiment of the present invention.

A sixth preferred embodiment is shown in FIG. 8, which is similar to the sixth preferred embodiment, but which includes first and second transverse support members 512a and 512b, respectively, one biased toward each side of the connector 10. As will be recognized by those of ordinary skill in the art from reading this disclosure, the first transverse support member 512a will resist pressure forces from the direction of the second transverse support member 512b, and the second transverse support member 512b would resist pressure forces from the direction of the first transverse support member 512a.

The method of making the connector 10 is discussed hereinbelow. For purposes of clarity, the method is described with reference to the first preferred embodiment shown in FIGS. 1 and 2 and is intended as illustrative of the method of making all embodiments of the present invention. In preparation for placement into an injection mold (not shown), the conductor pins 14 and transverse support member 12 are preferably heated to at least approximately 200 degrees Fahrenheit, and preferably to approximately 400 degrees Fahrenheit, prior to injecting polymeric material into the mold. It is contemplated, however, that the step of heating the conductor pins 14 and transverse support member 12 could occur either before or after placing the conductor pins 14 and transverse support member 12 within the injection mold.

The conductor pins 14 and transverse support member 12 are placed within the injection mold having the desired finished shape of the molded body 16, the positioning being such that the conductor pins 14 are spaced from the transverse support member 12. Preferably substantially all air is removed from the mold prior to injecting the polymeric material into the mold. This is accomplished through evacuation of the mold using conventional apparatus such as a vacuum pump (not shown).

A polymeric material, most preferably PEK is injected into the injection mold for creating the molded body 16 which surrounds the conductor pins 14 and electrically insulates the conductor pins from the transverse support member 12. The polymeric material of the molded body 16 forms an electrically insulating barrier between the conductor pin 14 and the transverse support member 12 by flowing between through the passage 18, thus forming an insulator between the two components. This is a significant departure from the prior art multi-pin connectors (not shown) wherein insulating bushings (not shown) are used to electrically insulate the conductor pins 14 from supporting structures.

Preferably the polymeric material is heated to at least 500 degrees Fahrenheit, and more preferably to about 700 degrees Fahrenheit, prior to injecting the polymeric material into the mold. The polymeric material is preferably injected into the mold at a pressure of at least 7500 pounds per square inch, and most preferably about 18,000 pounds per square inch. Following the injection step, the connector 10 is preferably heated to relieve stress in the polymeric material, thus minimizing the risk that post-cooling contraction of the molded body 16 will distort the conductor pins 14, causing a short among the conductor pins 14 or between the conductor pins 14 and the transverse support member 12. It is preferred that the heating is to a minimum of the rated operating temperature of the connector 10, about 400–500 degrees Fahrenheit for application of the connector 10 in a downhole well.

Following the stress relief step, the entire assembly is permitted to cool, whereby the polymeric material of the molded body 16 shrinks and forms a pressure-tight bond with the pins, capturing the circumferential interlocking member 20 on the conductor pin 14. Significantly, no bonding agent or adhesive is required to effect a pressure-tight bond between the molded body 16 and the conductor pins 14 inasmuch as the present method provides such a pressure-tight bond between the conductor pins 14 and the molded body 16. The polymeric material also effectively captures the transverse support member 12 by bonding therewith, thus completing the supporting structure for the conductor pins 14.

The molded body 16, conductor pins 14 and transverse support member 12 are removed from the injection mold and the molded body 16 is machined to provide any features not specifically molded into the molded body 16, or to refine features that have been molded in.

It will be appreciated by those skilled in the art that changes could be made to the embodiments described above without departing from the broad inventive concept thereof As stated above, the present invention is not limited in application to downhole well tools but may have application in any configuration wherein sealing a bulkhead is an objective. It is understood, therefore, that this invention is not limited to the particular embodiments disclosed, but it is intended to cover modifications within the spirit and scope of the present invention as defined by the appended claims.

What is claimed is:

1. A hermetic pressure connector for providing a pressure-tight, electrically-conductive connection through a hole in a bulkhead, the connector comprising:
    a transverse support member having a high pressure side and an opposite low pressure side with a passage extending through the transverse support member between the opposite sides;
    a conductor pin extending through the passage; and
    a molded body of a polymeric material surrounding at least a central portion of the conductor pin both in the passage and beyond the passage at least at one of the high and low pressure sides to thereby mechanically support the conductor pin in the passage and electrically insulate the transverse support member from the conductor pin, the molded body being directly sealingly engaged with the conductor pin and the transverse support member.

2. The hermetic pressure connector of claim 1 wherein the transverse support member is constructed of a metallic material.

3. The hermetic pressure connector of claim 1, wherein the conductor pin includes a circumferential interlocking member encased by the molded body for interlocking the conductor pin and the molded body.

4. The hermetic pressure connector of claim 3, wherein the circumferential interlocking member includes a circumferential groove formed in the conductor pin.

5. The hermetic pressure connector of claim 1, wherein a circumferential groove is formed in an external surface of the molded body.

6. The hermetic pressure connector of claim 5, wherein a circumferential seal ring is positioned in the circumferential groove.

7. The hermetic pressure connector of claim 1, wherein the transverse support member further includes external threads and the molded body includes at least two opposing flattened external gripping surfaces.

8. The hermetic pressure connector of claim 1, wherein the molded body further includes a coupling ridge.

9. The hermetic pressure connector of claim 1, wherein the conductor pin is constructed of beryllium copper.

10. The hermetic pressure connector of claim 1, wherein the conductor pin and transverse support member are insert-molded with the plastic body.

11. The hermetic pressure connector of claim 1, wherein the molded body surrounds the central portion of the conductor pin beyond the passage at the high pressure side.

12. The hermetic pressure connector of claim 11, wherein the molded body surrounds the central portion of the conductor pin beyond the passage at the low pressure side.

13. The hermetic pressure connector of claim 1, wherein the molded body extends beyond the transverse support member at least at one of the high and low pressure sides.

14. The hermetic pressure connector of claim 1, wherein the transverse support member comprises a plate, at least a portion of which is embedded in the molded body.

15. The hermetic pressure connector of claim 14, wherein the plate has an outside diameter that is substantially equal to an outside diameter of the molded body.

16. The hermetic pressure connector of claim 1, wherein the transverse support member has an outside diameter that is substantially equal to an outside diameter of the molded body.

17. A hermetic pressure connector for providing a pressure-tight, electrically-conductive connection through a hole in a bulkhead, the connector comprising:
    a transverse support member having a high pressure side and an opposite low pressure side with a passage extending through the transverse support member between the opposite sides;
    a conductor pin extending through the passage; and
    a molded body surrounding at least a central portion of the conductor pin both in the passage and beyond the transverse support member at the high and low pressure sides to thereby mechanically support the conductor pin in the passage and electrically insulate the transverse support member from the conductor pin, the molded body being directly sealingly engaged with the conductor pin and the transverse support member.

18. The hermetic pressure seal of claim 17, wherein the molded body and the transverse support member together form a shoulder at the low pressure side to thereby engage an opposing surface of the bulkhead when the connector is installed in the bulkhead.

19. The hermetic pressure connector of claim 17, wherein the transverse support member comprises a plate, at least a portion of which is embedded in the molded body.

20. The hermetic pressure connector of claim 19, wherein a portion of the molded body located at the high pressure side has an outside diameter that is substantially equal to an outside diameter of the plate.

21. The hermetic pressure connector of claim 20, wherein a portion of the molded body located at the low pressure side has an outside diameter that is less than the outside diameter of the plate to thereby form the shoulder.

* * * * *